United States Patent Office 3,353,512
Patented Nov. 21, 1967

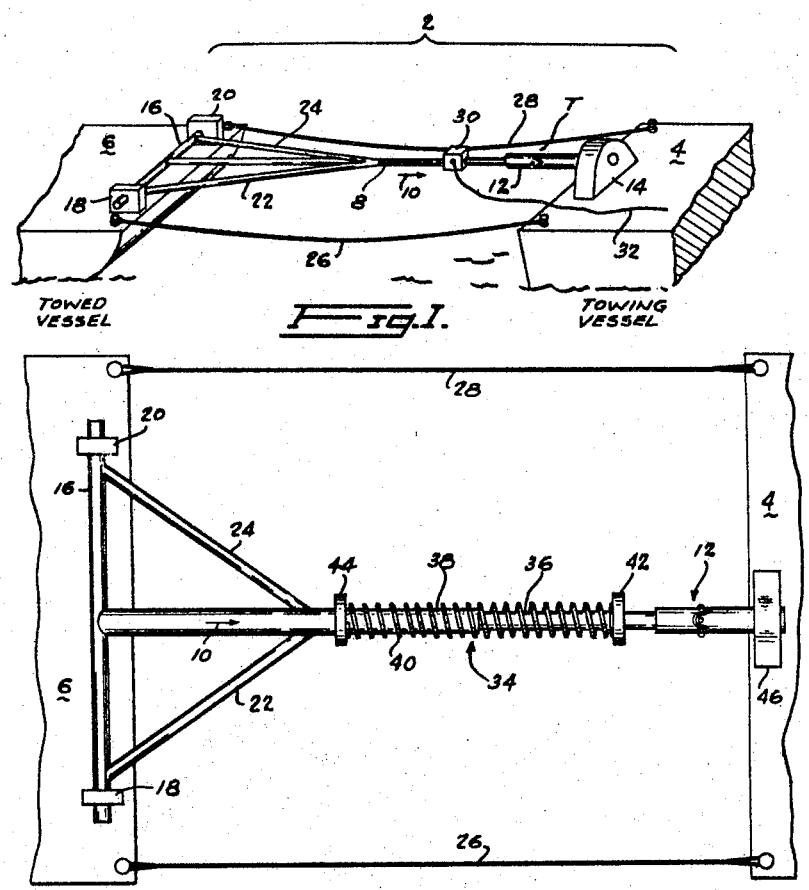

3,353,512
MARINE COUPLING
Sydney T. Mathews and Leopold I. Kawerninski, Ottawa, Ontario, Canada, assignors to Canadian Patents and Development Limited, Ottawa, Ontario, Canada, a corporation of Canada
Filed Apr. 10, 1967, Ser. No. 629,651
Claims priority, application Canada, July 21, 1966, 966,024
23 Claims. (Cl. 114—235)

ABSTRACT OF THE DISCLOSURE

A device for interconnecting water-borne vessels so that one of the vessels can tow or push the other vessel. A single rigid structural member extends between the vessels, and is connected to one of the vessels by a universal joint, whereby controlled relative heave, pitch, roll, yaw and, in some cases, surge is permitted between the vessels.

---

This application is a continuation-in-part of application Ser. No. 473,748, filed July 21, 1965.

This invention relates to coupling arrangements for water-borne vessels, and more particularly, it relates to a coupling arrangement that can be used for close-hauled towing or pushing of vessels.

In the past, when one vessel towed another, for example when a tug towed one or more barges, it was necessary to provide a relatively long tow line between the towed vessel and the towing vessel. Upon occasion, up to a mile of towing cable was used. The purpose of the long cable was to permit towing with safety, e.g. to reduce the danger that waves and wind would bring the towed vessel crashing into the towing vessel. An additional important reason for a long towing cable was to provide elasticity during sudden relative movements between the towed and towing vessels. Shorter cables have been tried, but in rough water they tended to break, because there was not enough "sag" to adsorb sudden relative movements between the vessels.

However, serious navigational problems have arisen with long towing cables, for example when towing through narrow straits or around corners, or when attempting to stop the towed vessel. In addition currents and winds have tended to take control of the towed vessel.

Moreover, in the past, when one vessel pushed another, for example when a tug pushed one or more barges (see Glosten, U.S. Patent No. 3,257,985), the vessels were interconnected by rigid structural members which, while permitting relative heave, pitch and roll between the vessels, restrained relative surge, side sway and yaw between the vessels, whereby stresses tended to develop in the structural members when one of the vessels was subjected to forces causing it to surge, sway or yaw relative to the other vessel.

It is therefore an object of the present invention to provide a coupling arrangement for towing in which the towed vessel is close-hauled behind the towing vessel and in which the control of the towing vessel over the towed vessel is improved.

It is a further object of the invention to provide a coupling arrangement for similarly interconnecting a pair of vessels in a pushing relationship with improved control.

Other objects and advantages of the present invention will appear from the following description, in which the embodiments illustrated are illustrative only, the broad scope of the invention being defined by the appended claims.

In the drawings:

FIGURE 1 is a diagrammatic perspective view of a device according to the present invention connecting a towing and towed vessel;

FIGURE 2 is a plan view of a second embodiment of the present invention as used to connect two vessels;

Figure 3:
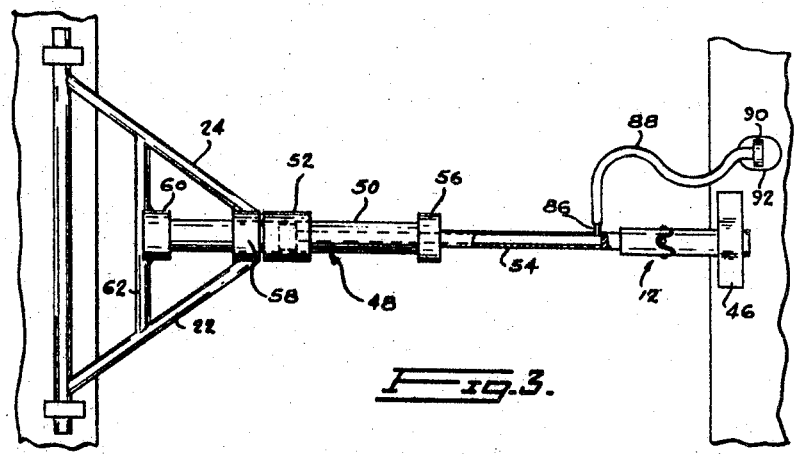
FIGURE 3 is a plan view of a third embodiment of the present invention as used to connect two vessels.

Referring firstly to FIGURE 1, there is shown a towing device generally indicated at 2 connecting a towing vessel 4 with a towed vessel 6. The towing device 2 comprises a tubular steel shaft 8 extending along the path of travel between the two vessels 4 and 6, the path of travel being indicated by an arrow 10, the shaft 8 being the sole rigid structural member extending between the vessels. At its forward end, the shaft 8 is connected to a universal joint 12 which in turn is rotatably mounted in a thrust-bearing mounting 14 firmly fastened to the stern of the towing vessel 4. The combination of the thrust-bearing mount 14 and the universal joint 12 permits three degrees of rotational movement of the shaft 8 with respect to the towing vessel 4.

At its rearward end, the shaft 8 is connected to a shaft 16 having a horizontal axis oriented transversely to the axis of the shaft 8, i.e. transversely to the path of travel as indicated by the arrow 10. Respective ends of shaft 16 are pivotally mounted in mounting members 18 and 20 respectively spaced across the bow of the towed vessel 6. Strengthening support members 22 and 24 extend from respective end portions of the shaft 16 to a position intermediate the ends of the shaft 8. Safety cables 26 and 28 are provided connected from each side of the bow of the towed vessel 6 to respective sides of the stern of the towing vessel 4.

In the arrangement just described, the length of the towing device 2 will generally be about 20% of the length of the towed vessel. It has been found in tests that stresses in the towing device 2 will generally be reduced to a minimum if the length of such device is about the same as the length of the towed vessel 6, but for large towed vessels, this would require unduly massive structural members for the device 2 and would be impractical. Therefore, a length for the towing device 2 of about 20 to 25% of that of the towed vessel has been found to be a convenient compromise.

It is further found that it is preferable to have one degree of rotational movement, permitted by mounting members 18 and 20, at the connection of the towing device 2 with the towed vessel 6, and three degrees of rotational movement, permitted by the universal joint 12 and the thrust-bearing 14, at the connection of the towing device with the towed vessel 4, whereby, at least, relative heave, roll, pitch and yaw is permitted between the vessels 4 and 6. This moves the effective towing point, indicated by reference character T in FIGURE 1, farther forward and provides better control over the towed vessel. Slack safety cables 26 and 28 assist in preventing the towed vessel 6 from swinging around too far sideways of the towing vessel 4, but the cables 26 and 28 are sufficiently slack so as not to effect normal degrees of relative yaw between the vessels.

The device as just described is useful primarily for sheltered waters. When waves become large, the stresses in the structural member such as shaft 8 making up the device 2 become large, often undesirably large. It is found that certain combinations of wavelengths and height and vessel speed, produce a resonance effect in the towing device in which the tension and compression stresses reach large peaks (for example, up to 60 to 90 tons per foot of wave height for a barge of 2500 tons displacement and 200 feet in length towed by a towing device of about 35 feet in length at a speed of about 6½ knots). Accordingly, it may be desirable to provide a stress measuring device 30 on the shaft 8. Stress measuring device 30 will provide an electrical signal indicative of the stresses in shaft 8, and such signal will be conducted along conductors 32 to an indicator (not shown) on the towing vessel 4, so that the towing vessel may if necessary reduce speed, or alter course, to reduce the stresses. Alteration of course across the wave fronts, as opposed to a path of travel directly into the waves, will reduce tension and compression forces in the device 2, but will permit increased rolling of the towed vessel, since relative rolling between the two vessels is not resisted by the device 2.

For towing in less sheltered waters, a device such as that illustrated in FIGURE 2 may be used. The device of FIGURE 2 is similar to that of FIGURE 1 and corresponding reference numerals represent like parts. In the device of FIGURE 2, the rigid shaft 8 has been replaced by a telescopic shaft generally indicated at 34, which permits limited surge between the vessels 4 and 6. Telescopic shaft 34 has a forward shaft portion 36 connected to the universal joint 12 and a rear shaft portion 38 connected to the transverse shaft 16. Shaft portions 36 and 38 are telescopically movable with respect to one another along the path of travel 10 and are also rotatable with respect to one another about their axes.

A heavy coil spring 40 is provided, one end of spring 40 being connected to a stop mounting member 42 on forward shaft portion 36, and the other end of spring 40 being connected to a stop mounting member 44 on rear shaft portion 38. The rotation of thrust bearing mounting member 14 of FIGURE 1 may be eliminated in the FIGURE 2 arrangement since coil spring 40 permits to the limited extent necessary one degree of rotational movement of rear shaft portion 38 with respect to the towing vessel 4. (The other two degrees of rotational movement, about axes transverse to the path of travel 10, are permitted by universal joint 12.) The towing vessel end of universal joint 12 is therefore rigidly mounted on the towing vessel by means of a mounting block 46.

In the device of FIGURE 2 tension and compression peak forces in the towing device are reduced considerably in comparison with the arrangement of FIGURE 1, due to the presence of spring 40. In fact, the peak forces may be reduced to approximately 15% of the forces obtained with the rigid towing connections shown in FIGURE 1. The spring arrangement shown in FIGURE 2 is self-centering, i.e., there is no creeping of the mean position of rearward and forward travel of the shaft portions 36 and 38 (except possibly for minor changes in position due to permanent distortion of the spring 34). The length of relative travel required between telescopic shaft portions 36 and 38, and the stiffness required for the spring 40, will depend upon the weight and length of the towed vessel and the severity of sea conditions expected.

The device of FIGURE 2, although it possesses significant advantages over the device of FIGURE 1, may be difficult to manufacture in some cases because of the very large coil spring required where heavy vessels are to be towed. Typical spring characteristics for a towing device of 40 foot overall length used to tow the 200 foot barge of 2500 tons displacement previously referred to are: stiffness—about 3100 pounds per inch; full scale stiffness—about ±200 tons.

Figure 4:
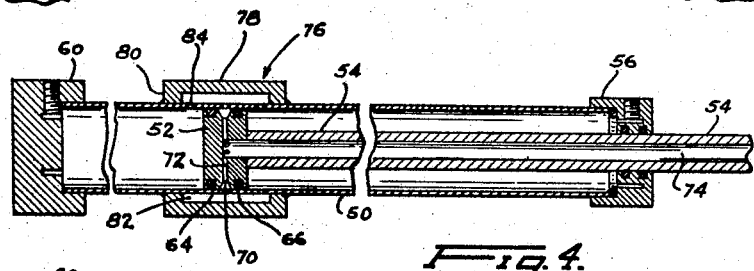
FIGURE 4 is a side view, partly in section, of a cylinder and piston arrangement as used in the device of FIGURE 3.

Because of the inconvenience involved in obtaining suitably large coil springs, it may be desirable to replace the coil spring 40 of FIGURE 2 by a pneumatic spring of the type shown generally at 48' in FIGURES 3 and 4.

As shown generally in FIGURE 3, pneumatic spring 48 comprises a double ended cylinder 50 within which is rotatably mounted a double acting piston 52. A tubular hollow piston rod 54 is connected to piston 52 and extends outwardly through a packing gland 56 in the forward end of cylinder 50. The end of piston rod 54 remote from the piston 52 is connected to the universal joint 12, which is in turn connected to rigid mounting block 46, no thrust bearing rotation being needed since piston 52 and cylinder 50 are free to rotate with respect to one another.

Cylinder 50 is provided near its midpoint with a collar 58 to which are connected the strengthening support members 22 and 24. A second collar 60 is located at the rearward end of cylinder 50 and is connected to a cross shaft 62 which is in turn also connected to the strengthening support members 22 and 24.

A partly sectional view of pneumatic spring 48 is shown in FIGURE 4. As shown in FIGURE 4, piston 52 is provided with two peripheral sealing rings 64 and 66 one at each end of the piston. Between the sealing rings 64 and 66 is located a peripheral groove 70 connected by a passage 72 to an interior passage 74 extending lengthwise in piston rod 54.

At the midpoint of cylinder 50 is mounted an exterior jacket 76 having a wall portion 78 spaced from and concentric with the cylinder 50 and having end walls 80 welded or otherwise sealingly secured to the exterior surface of cylinder 50. The jacket 76 thus defines a space 82 sealed from the atmosphere and located exteriorly of the midpoint of the cylinder 50. A series of apertures 84 are provided in the cylinder beneath the jacket 76 to permit communication between the space 82 and the interior of cylinder 50. The jacket 76 together with the apertures 84, thus in effect provides passage means communicating the interior of cylinder 50 on one side of the midpoint thereof with the interior of the cylinder 50 at the other side of the midpoint thereof.

The passage 74 in piston rod 54 extends to a port 86 in the piston rod, for admitting gas to the interior of the piston rod. A conduit 88 (FIGURE 3) extends from the port 86 to a regulator valve 90 of a source 92 of compressed gas (for example, compressed air).

In the use of the device of FIGURES 3 and 4, relative motion between the towed and towing vessels 4 and 6 respectively due to waves will cause the piston 52 to travel (and probably also rotate) back and forth within the cylinder 50. Travel of the piston within the cylinder will produce compression of the gas within one half of the cylinder and such compressed gas will resist the motion of the piston, so that a spring effect is provided.

It will be seen that the pneumatic spring 48 of FIGURES 3 and 4 is in effect a variable stiffness spring. For example, the stiffness may be increased by increasing the average pressure of gas within the cylinder 50. This is done by admitting higher pressure gas via conduit 88 to the interior passage 74 in piston rod 54. The compressed gas passes through passage 74, through the passage 72 and peripheral groove 70 in the piston 52, through those apertures 84 located above the peripheral groove 70, through space 82, and then through others of the apertures 84 into both halves of the cylinder 50. The average pressure in both halves of the cylinder 50 is thus increased.

It is apparent that the piston 52 must be approximately at the midpoint of cylinder 50 in order that gas may enter the cylinder via the path just described. When waves are present, the piston 52 will oscillate back and forth past the midpoint of the cylinder 50, and gas will enter the cylinder at the times when the piston 52 passes beneath the apertures 84. Under steady towing conditions in a calm sea, the piston 52 will be forward of the midpoint of the cylinder 50, but the piston can be moved past the midpoint of the cylinder by reducing the speed of the towing vessel 4. The inertia of the towed vessel 6 will then carry the towed vessel 6, and the cylinder 50, forward with respect to the piston 52 and will thus move the piston past the midpoint of the cylinder.

The average pressure in the cylinder 50 is reduced in the same way in which it is increased, except that gas is exhausted from the passage 74.

Adjustments in the average gas pressure in the cylinder 50 can thus be made as deemed appropriate to vary the stiffness of pneumatic spring 58, depending upon wave and other conditions.

By way of example, for a towing device of 50 foot overall length used to tow the 200 foot 2500 ton barge previously referred to, the product of PA (where P is the pressure in the cylinder 50 with the piston at the midpoint and A is the interior cross sectional area of the cylinder) may be about 60 tons. The initial stiffness of the pneumatic spring 48 is proportional to the product PA and when the product PA is about 60 tons, the oscillating forces developed in the towing device of FIGURE 3 will be about the same as that for FIGURE 2, i.e. about 15% of the forces developed in the device of FIGURE 1. Reducing the product PA to, e.g., 30 tons, by reducing the pressure in the cylinder 50, reduces the oscillating forces to about half of the values observed at a value for PA of 60 tons, but under large wave conditions the barges may tend to "slam" with resultant shock forces developed in the towing device.

The pneumatic spring 48 is "self-centering" in the sense that it will eventually return to a mean position, i.e. small leakages of gas from either end of the cylinder will not cause the mean position of travel of the piston gradually to move toward the leaking end of the cylinder. This is because should the average pressure in the cylinder 50 to one side of the piston 52 tend to become higher than the average pressure in the cylinder 50 to the other side of the piston 52 (e.g. due to minor leakages) then, as the piston 52 passes the midpoint of the cylinder 50, gas will pass from one side of the piston to the other through the passage means defined by the aperture 84 and jacket 76. Normally the movement of the water will produce sufficient travel of the piston in the cylinder to ensure that the piston crosses the mid-point reasonably frequently. In very still water, this result can always be obtained by varying the pull in the coupling by momentarily slowing or speeding up the towing vessel. Such flow of gas will tend to equalize the pressures in opposite halves of the cylinder 50. It is important that pneumatic spring 48 be provided with this self-centering capability, in order to prevent loss of advantage through creeping of the mean position of travel of piston 52 away from the midpoint of cylinder 50.

It is found that the non-linear characteristics of pneumatic spring 48, as opposed to the relatively linear characteristics of a coil spring, are of value in absorbing stresses that would otherwise be set up in the towing device 2. This is because the resistance to relative motion between the cylinder 50 and the piston 52 increases as the piston approaches the end of the cylinder, so that there is always a "buffer" between the cylinder and piston. It may be desirable to provide pressure measuring means (not shown) so that observations can be made of the peak pressures in the piston and appropriate safety measures taken if such pressures become too high. An automatic pressure relief valve (not shown) could also be fitted.

It will be realized that gas could be admitted to the interior of the cylinder 50 in other ways than through passages in the piston rod and piston. For example, gas could be admitted or removed through a tap (not shown) connected to either end of the cylinder 50. Because of the presence of the passage means defined by apertures 84 and jacket 76, the average pressures in both halves of the cylinder i.e. on either side of the piston 52, would be equalized when the piston moved past the midpoint of cylinder 50. However, admission of gas in this manner is more likely to tend to push the piston away from the midpoint of cylinder 50 than is admission of gas through the piston as described in FIGURES 3 and 4, and for this reason, the FIGURES 3 and 4 arrangement is preferred.

Figure 5:
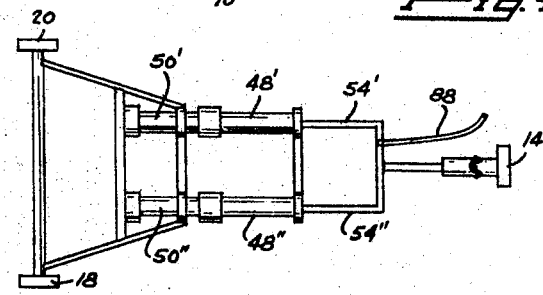
FIGURE 5 illustrates a modification of the arrangement of FIGURE 3.

It will be apparent that numerous modifications and changes may be made within the scope of the present invention. For example, the arrangement of the piston and cylinder could be reversed, the cylinder 50 being connected to the universal joint 12 and the piston rod 54 being connected to supporting members 22 and 24. The apertures 84 could be replaced by a slot extending along the cylinder 50 adjacent the midpoint thereof. The universal joint 12 could be replaced by a ball type joint. In addition, if desired, and as shown in FIGURE 5, a towing device may be constructed in which two or more pneumatic springs 48' and 48" are employed, such pneumatic springs having cylinders 50' and 50", and piston rods 54' and 54", respectively. The remainder of the arrangement is substantially as shown in FIGURE 3 (except that thrust bearing mounting 14 is employed on the towing vessel 4) and like numerals represent like parts. The configuration of FIGURE 5 may also be adopted using two or more coil springs as shown in FIGURE 2 in place of the pneumatic springs 48' and 48".

Figure 6:
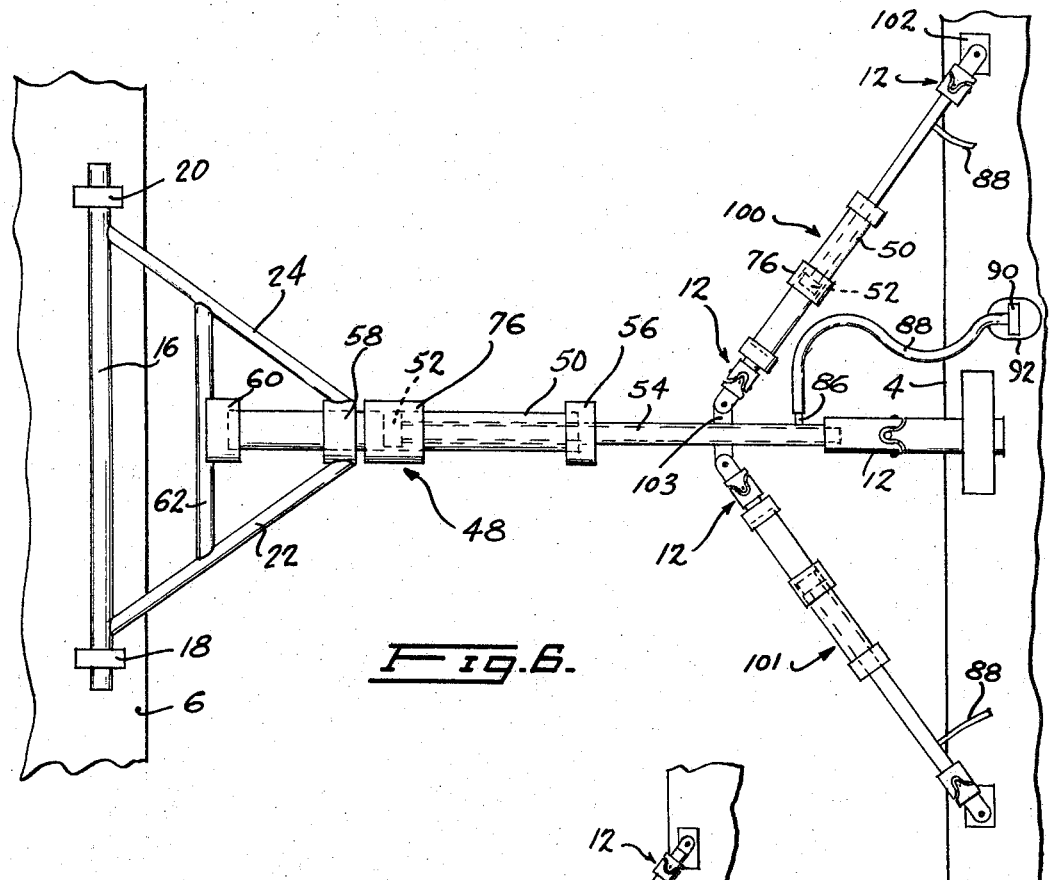
FIGURE 6 shows a plan view of a pushing coupling.

FIGURE 6 shows a coupling device which can be used for the pushing or towing of one vessel by another, but which is preferably used as a pushing coupling connected between two vessels. The pneumatic spring 48 is the same as in FIGURES 3 and 4, but a pair of yaw control pneumatic springs 100 and 101 have been added whereby limited controlled yaw is permitted between the vessels 4 and 6. These are the same as each other, and thus only the spring 100 will be described. It is essentially the same as the spring 48, comprising a piston 52 in a cylinder 50 with a jacket 76 and having the same internal structure as is shown in FIGURE 4. At respective ends the spring 100 is connected through a universal joint 12 having three degrees of freedom to a mounting 102 on the vessel 4 and a bracket 103 secured to the piston rod 54. Compressed air is introduced by conduit 88, as before.

As will be apparent from FIGURE 6, the two yaw control springs 100, 101 will act ancillary to the main spring 48 to keep the vessels generally axially aligned during the pushing of one by the other.

The principle embodied in FIGURE 6 is also applicable to springs of the mechanical type employed in the embodiment of FIGURE 2.

Figure 7:
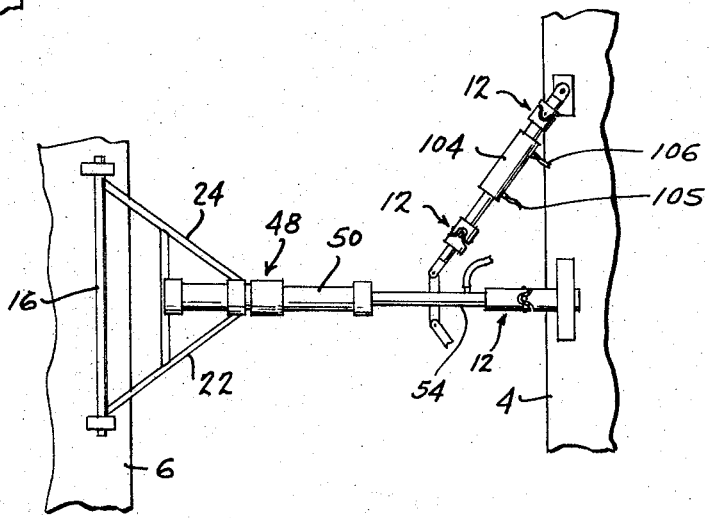
FIGURE 7 is a modification of FIGURE 6.

If it is desired to be able to steer the vessels by means of the coupling between them, the alternative arrangement illustrated in FIGURE 7 can be used, in which there is provided on each side of the pneumatic spring 48 a yaw control cylinder assembly 104 that is a simple double acting pneumatic cylinder to each end of which pressure air can be admitted from a control valve through one or other of conduits 105, 106. By extending the cylinder assembly 104 on one side and simultaneously contracting the corresponding assembly on the other side, a steering effect between the vessels is achieved.

In the arrangement shown in FIGURES 6 and 7, the vessels can be travelling in either direction, but preferably the arrangement will be such that travel is from left to right, that is with the vessel 6 pushing the vessel 4.

Although for the purpose of symmetry two yaw control springs are used, it will be readily apparent that one such spring could be used to perform the same function as the two springs shown in FIGURES 6 and 7.

We claim:

1. In combination:
   (a) a towing vessel including a first mounting means fastened thereto, said first mounting means being disposed substantially on the longitudinal axis of said towing vessel, (b) a towed vessel, (c) a coupling device interconnecting said vessels for towing said towed vessel along a path of travel, (d) said towed vessel including second mounting means comprising a pair of mounting portions fastened to the bow of said towed vessel in spaced apart relation to define a horizontal axis transverse to said path of travel, and (e) said coupling device including:
- (i) rigid structural member means extending along said path of travel between said vessels and constituting the sole rigid connection between said vessels,
- (ii) connecting means, including universal joint means, connecting said structural member means to said first mounting means to permit three degrees of rotationaly movement of said structural member means relative to said first mounting means and thus of said towed vessel relative to said towing vessel, and
- (iii) means rotatably connecting said structural member means to said mounting portions to permit rotational movement of said structural member means about said horizontal axis, whereby to enable relative yaw, pitch, heave and roll between said vessels.

2. The combination of claim 1, including spring means connected between said structural member means and said connecting means to permit limited movement in the direction of said path of travel between said structural member and connecting means, thus enabling limited surge between said vessels.

3. The combination of claim 2 wherein said spring means comprises pneumatic spring means extending along said path of travel, said pneumatic spring means including gas filled cylinder means and piston means in said cylinder means, said piston means being movable along said path of travel with respect to said cylinder means, said gas in said cylinder means resisting movement of said piston means with respect to said cylinder means.

4. In combination:
(a) a towing vessel including a first mounting means fastened thereto, said first mounting means being disposed substantially on the longitudinal axis of said towing vessel,
(b) a towed vessel,
(c) a coupling device interconnecting said vessels for towing said towed vessel along a path of travel,
(d) said towed vessel including second mounting means comprising a pair of mounting portions fastened to the bow of said towed vessel in spaced apart relation to define a horizontal axis transverse to said path of travel, and
(e) said coupling device including:
- (i) rigid structural member means extending along said path of travel between said vessels,
- (ii) connecting means, including universal joint means, connecting said structural member means to said first mounting means to permit three degrees of rotational movement of said structural member means relative to said first mounting means and thus of said towed vessel relative to said towing vessel,
- (iii) spring means connected between said structural member means and said connecting means to permit limited movement in the direction of said path of travel between said structural member and mounting means and thus between said vessels,
- (iv) means rotatably connecting said structural member means to said mounting portions to permit rotational movement of said structural member means about said horizontal axis, whereby to enable relative yaw, pitch, heave, roll and surge between said vessels.

5. The combination of claim 4 wherein said spring means comprises pneumatic spring means extending along said path of travel, said pneumatic spring means including gas filled cylinder means and piston means in said cylinder means, said piston means being movable along said path of travel with respect to said cylinder means, said gas in said cylinder means resisting movement of said piston means with respect to said cylinder means.

6. The combination of claim 5 wherein said pneumatic spring means includes means to vary the pressure of said gas within said cylinder means whereby to vary the stiffness of said pneumatic spring means, and means for equalizing the pressure of said gas in the respective ends of said cylinder means when said piston means is intermediate said ends whereby to cause a self-centering of said piston means in said cylinder means.

7. The combination of claim 5 wherein said cylinder means includes a double ended gas filled cylinder, said piston means including a double ended piston rotatably fitted within said cylinder, and a piston rod connected to said piston and extending from said cylinder along said path of travel.

8. The combination of claim 7 including means for admitting gas to said cylinder to vary the pressure of the gas therein, and means for equalizing the pressure of said gas in the respective ends of said cylinder when said piston is at the midpoint of said cylinder whereby to cause self-centering of said piston in said cylinder.

9. The combination of claim 8 wherein said means for equalizing the pressure in said cylinder includes apertures in said cylinder adjacent the midpoint thereof, and passage means exterior to said cylinder communicating among said apertures, said means for admitting gas to said cylinder including a first passage in said piston rod.

10. The combination of claim 9 wherein said piston includes first circumferential sealing means at one end portion thereof and in sealing engagement with said cylinder, second circumferential sealing means at the other end portion thereof, and in sealing engagement with said cylinder, and a second passage communicating between said first passage and the exterior of said piston intermediate said sealing means, said apertures in said cylinder being spaced apart by a distance greater than the distance between said first and second sealing means, said cylinder also including an aperture at the midpoint thereof.

11. The combination of claim 10, including a pressure source of said gas, conduit means communicating said source with said aperture in said piston rod, and means for adjusting the pressure of said gas in said conduit means.

12. In combination:
(a) a first vessel including a first mounting means fastened thereto, said first mounting means being disposed substantially on the longitudinal axis of said first vessel,
(b) a second vessel,
(c) a coupling device interconnecting said vessels for movement along a path of travel,
(d) said coupling device including second mounting means comprising a pair of mounting portions fastened to an end of said second vessel in horizontal spaced apart relation in a direction transverse to said path of travel,
(e) said coupling device including:
- (i) rigid structural member means extending along said path of travel between said vessels,
- (ll) connecting means, including universal joint means connecting said structural member means to said first mounting means to permit three degrees of rotational movement of said structural member means relative to said first mounting means and thus of said vessel relative to each other, (iii) means rotatably connecting said structural member means to said mounting portions to permit rotational movement of said structural member means about a horizontal axis transverse to said path of travel, whereby to enable relative yaw, pitch, heave and roll between said vessels, (iv) spring means connected between said structural members and said connecting means to permit limited movement in the direction of said path of travel between said structural member and connecting means, thus enabling limited surge between said vessels, and (v) yaw control means extending from said structural member means to said first vessel laterally of said first mounting means, said yaw control means including spring means limiting said yaw between said vessels.

13. The combination of claim 12 wherein said spring means (iv) comprises pneumatic spring means extending along said path of travel, said pneumatic spring means including gas filled cylinder means and piston means in said cylinder means, said piston means being movable along said path of travel with respect to said cylinder means, said gas in said cylinder means resisting movement of said piston means with respect to said cylinder means.

14. The combination of claim 12 wherein said yaw control spring means (v) comprises a pneumatic spring including a gas filled cylinder and a piston in said cylinder, said piston being movable with respect to said cylinder, said gas in said cylinder resisting movement of said piston with respect to said cylinder.

15. The combination of claim 14 wherein said pneumatic spring is a double acting pneumatic cylinder comprising means for selectively admitting gas to each end of said cylinder, whereby said pneumatic spring can be used to steer said vessels.

16. In combination:
(a) a pushed vessel including a first mounting means fastened thereto, said first mounting means being disposed substantially on the longitudinal axis of said pushed vessel,
(b) a pushing vessel,
(c) a coupling device interconnecting said vessel, whereby said pushing vessel can push said pushed vessel along a path of travel,
(d) said pushing vessel including second mounting means comprising a pair of mounting portions fastened to the bow of said pushing vessel in spaced apart relation to define a horizontal axis transverse to said path of travel, and
(e) said coupling device including:
(i) rigid structural member means extending along said path of travel between said vessels and constituting the sole rigid connection between said vessels,
(ii) connecting means, including universal joint means, connecting said structural member means to said first mounting means to permit three degrees of rotational movement of said structural member means relative to said first mounting means and thus of said pushed vessel relative to said pushing vessel, and
(iii) means rotatably connecting said structural member means to said mounting portions to permit rotational movement of said structural member means about said horizontal axis, whereby to enable relative yaw, pitch, heave and roll between said vessels,
(iv) spring means connected between said structural member means and said connecting means to permit limited movement in the direction of said path of travel between said structural member and connecting means, thus enabling limited surge between said vessels, and (v) yaw control means extending from said structural member means to said pushed vessel, laterally of said said first mounting means, said yaw control means including spring means limiting said yaw between said vessels.

17. For interconnecting first and second vessels for movement along a path of travel, a coupling device comprising:
(a) first mounting means adapted to be fastened to said first vessel,
(b) second mounting means including first and second mounting portions adapted to be fastened across an end of said second vessel in horizontal spaced apart relation in a direction transverse to said path of travel,
(c) connecting means comprising structural member means for connecting said vessels and including:
(i) universal joint means connecting said structural member means to said first mounting means to permit three degrees of rotational movement of said structural member means relative to said first mounting means and thus of said vessels relative to each other, and
(ii) means rotatably connecting said structural member means to said mounting portions to permit rotational movement of said structural member means about a horizontal axis transverse to said path of travel, whereby to enable relative yaw, pitch, heave and roll between said vessels,
(d) spring means connected between said structural members means and said universal joint means to permit limited movement in the direction of said path of travel between said structural member and mounting means and thus to permit surge between said vessels,
(e) and yaw control means extending from said structural member means to said first vessel laterally of said first mounting means, said yaw control means including spring means limiting said yaw between said vessels.

18. A device according to claim 17 wherein said yaw control means comprises a pair of control members one on each side of said structural member.

19. A device according to claim 18 wherein each said control member comprises a pneumatic spring including a gas filled cylinder and a piston in said cylinder, said piston being movable with respect to said cylinder, said gas in said cylinder resisting movement of said piston with respect to said cylinder.

20. A device according to claim 19 wherein said pneumatic spring is a double acting pneumatic cylinder comprising means for selectively admitting gas to each end of said cylinder, whereby said pneumatic spring can be used to steer the vessel.

21. For interconnecting a pushed and a pushing vessel for movement along a path of travel, a coupling device comprising:
(a) first mounting means adapted to be fastened to said pushed vessel,
(b) second mounting means including first and second mounting portions adapted to be fastened across the bow of said pushing vessel in horizontal spaced apart relation in a direction transverse to said path of travel,
(c) connecting means comprising structural member means for connecting said vessels and including:
(i) universal joint means connecting said structural member means to said first mounting means to permit three degrees of rotational movement of said structural member means relative to said first mounting means and thus of said vessels relative to each other, and
(ii) means rotatably connecting said structural member means to said mounting portions to permit rotational movement of said structural member means about a horizontal axis transverse to said path of travel, whereby to enable relative yaw, pitch, heave and roll between said vessels, (d) spring means connected between said structural member means and said universal joint means to permit limited movement in the direction of said path of travel between said structural member and mounting means and thus between said vessels, whereby to enable limited surge between said vessels, and (e) yaw control means extending from said structural member means to said first vessel laterally of said first mounting means, said yaw control means including spring means limiting said yaw between said vessels.

22. For towing a towed vessel along a path of travel behind a towing vessel, a coupling device comprising:

(a) a self-centering variable stiffness pneumatic spring including
 (i) a double ended gas filled cylinder to extend along said path of travel between said vessels,
 (ii) a double ended piston rotatably fitted within said cylinder,
 (iii) a piston rod connected to said piston and extending from said cylinder along said path of travel, said piston rod including a first passage extending longitudinally therein,
 (iv) said piston including first circumferential sealing means at one end portion thereof and in sealing engagement with said cylinder, second circumferential sealing means at the other end portion thereof and in sealing engagement with said cylinder, and a second passage communicating between said first passage and the exterior of said piston intermediate said sealing means,
 (v) said cylinder including an aperture adjacent each side of the midpoint thereof and spaced apart by a distance greater than the distance between said first and second sealing means, said cylinder also including an aperture at the midpoint thereof,
 (vi) passage means exterior to said cylinder communicating among said apertures,
 (vii) said piston rod including an aperture communicating with said first passage, for admission of gas to said cylinder, (b) first mounting means adapted to be fastened to said towing vessel, (c) means, including joint means, connecting said piston rod to said first mounting means to permit two degrees of rotational movement, about axes transverse said said path of travel, of said piston rod with respect to said first mounting means, (d) second mounting means, including first and second mounting portions adapted to be fastened across the bow of said towed vessel in horizontally spaced apart relation in a direction transverse to said path of travel, (e) and pivot means connecting said cylinder to said mounting portions to permit rotational movement of said cylinder about a horizontal axis transverse to said path of travel.

23. Apparatus according to claim 22, including a pressure source of said gas, conduit means communicating said source with said aperture in said piston rod, and means for adjusting the pressure of said gas in said conduit means.

References Cited
UNITED STATES PATENTS

| | | | |
|---|---|---|---|
| 3,062,170 | 11/1962 | Verneaux | 114—235 |
| 3,257,985 | 6/1966 | Glosten | 114—235 |

MILTON BUCHLER, *Primary Examiner.*

T. M. BLIX, *Assistant Examiner.*